United States Patent [19]

Shioda et al.

[11] Patent Number: 4,881,725
[45] Date of Patent: Nov. 21, 1989

[54] ACCUMULATOR PISTON HAVING A COIL SPRING SECURED THERETO

[75] Inventors: Yasuhiro Shioda, Toyota; Shinya Nakamura, Owariashahi; Makoto Funahashi; Seitoku Kubo, both of Toyota, all of Japan

[73] Assignee: Toyota Jidosha Kabushiki Kaisha, Japan

[21] Appl. No.: 156,575

[22] Filed: Feb. 17, 1988

[30] Foreign Application Priority Data

Feb. 23, 1987 [JP] Japan .................. 62-39901

[51] Int. Cl.$^4$ .......... F16F 1/12; F01B 31/00; F16L 55/04
[52] U.S. Cl. ..................... 267/179; 92/135; 138/31; 403/282
[58] Field of Search .......... 267/91, 166, 166.1, 267/167, 174, 170, 178, 179, 64.11, 289, 64.27, 150, 286; 29/512; 92/135, 130 R, 130 D, 132; 60/413; 138/31, 30, 26; 403/274, 277, 282

[56] References Cited

U.S. PATENT DOCUMENTS

| | | | |
|---|---|---|---|
| 3,122,829 | 3/1964 | Schaad et al. | 267/91 X |
| 3,782,708 | 1/1974 | Dulude et al. | 267/179 |
| 4,651,782 | 3/1987 | Fulmer | 138/31 |

FOREIGN PATENT DOCUMENTS

| | | | |
|---|---|---|---|
| 0360628 | 12/1915 | Fed. Rep. of Germany | 138/31 |
| 2136986 | 1/1980 | Fed. Rep. of Germany | 138/30 |
| 59-144801 | 8/1984 | Japan . | |
| 0048602 | 10/1986 | Japan | 267/179 |

Primary Examiner—Robert J. Oberleitner
Attorney, Agent, or Firm—Oliff & Berridge

[57] ABSTRACT

Herein disclosed is an accumulator for suppressing an abrupt rise in and suppressing the pressure of a fluid. In this accumulator, a coil spring for urging a piston fitted in a cylinder in the axial direction thereof is secured on the pistion by securing it on one side of a plate and by securing the plate on the piston. The plate is formed with a cylindrical nub, on which is fitted on turn of the coil spring. This coil spring is secured on the plate by deforming the nub radially outward to trap that one turn of the coil spring. The plate in turn is secured in a bottomed cylindrical hollow portion which is formed in the piston.

12 Claims, 1 Drawing Sheet

ACCUMULATOR PISTON HAVING A COIL SPRING SECURED THERETO

BACKGROUND OF THE INVENTION

The present invention relates to an accumulator for suppressing an abrupt rise in and accumulating the pressure of a fluid.

As is well known in the art, an automatic transmission for vehicles is constructed to change the transmission of a drive power in a gear train mechanism by engaging or releasing frictional engagement means such as a clutch or brake, and to change a gear ratio which may be set according to the output power of an engine and number of revolutions of an output shaft. The operations of the clutch or brake for switching that gear ratio is performed hydraulically, and shocks are caused if the hydraulic pressure rises abruptly for the gear shift. Generally in the prior art, therefore, in order to eliminate the gear shifting shocks, there is disposed upstream of the frictional engagement means an accumulator which can soften the abrupt rise or drop of the hydraulic pressure when the shift valve is switched.

One fundamental structure of the accumulator of the prior art is disclosed in Japanese Patent KOKAI No. 59-144801, for example. In this disclosure, a bottomed cylindrical piston is fitted slidable back and forth, while having its outer circumference sealed up with O-rings, in a cylinder formed in a valve body. A spring for acting against the hydraulic pressure is arranged to have its one end portion inserted in the piston so that the piston may be slowly moved while compressing the spring by that hydraulic pressure to soften the rise of the pressure.

In the accumulator having that fundamental structure, the sealing O-rings will establish a sliding resistance which will adversely affect the characteristics of the accumulator and accordingly the characteristics of the hydraulic circuit as a whole. For this reason, another spring is provided in the art to counteract the sliding resistance of the O-rings while the accumulator is operating.

In the accumulator of the prior art thus far described, the spring is retained in position by inserting it into a hollow portion of the piston. In order to improve the assemblability of the piston, it is preferable to set a gap between the outer circumference of the spring and the inner circumference of the piston thereby to bring the two members into the so-called "loosely fitted state". In this assembly, however, the spring is not fixed but allowed to move so that it has bad stability. Thus, the spring may go out of position to experience an interference with the piston such a frictional slide on the inner circumference of the piston. This raises a problem that the spring has its durability deteriorated. In order to solve this problem, it is conceivable to insert and retain the spring in close contact with the inner circumference of the hollow portion of the piston. With this structure, however, absence of any substantial gap between the spring and the piston will make it difficult to insert the spring snugly. Therefore, this structure encounters with a problem that the assemblability is inferior.

It is, therefore necessary for the structure of the prior art to set the difference between the external and internal radii and the spring and piston at such a value as to satisfy both the assemblability and stability of the spring. This necessity makes it difficult to manufacture and control the quality of the accumulator structure. Otherwise, another problem arises in that either the assemblability or stability of assembly has to sacrificed.

In the specification of U.S.P. No. 3,782,708, on the other hand, there is a structure for securing a coil spring on a plate. The plate has its one side punched to extrude a cylindrical nub, on the outer circumference of which is fitted one turn of one side of a coil spring. The nub is deformed outward to trap and secure that turn of the spring.

However, this structure restricts its spring securing member to the plate, which has to be formed with the punched hole. As a result, the spring securing structure cannot be used, as it is, for securing the so-called "block-shaped object" such as the piston of the aforementioned accumulator.

SUMMARY OF THE INVENTION

The present invention has been conceived in view of the background thus far described and has an object to provide an accumulator which can secure a spring easily and reliably on a piston.

This object can be achieved by securing one end portion of the spring on a plate and fixing the plate on the piston.

In the structure for securing the spring on the plate, this plate is formed with a cylindrical projection on which is fitted on turn of one end of the coil spring and which has its leading end portion deformed radially outward to trap that one turn of the spring.

According to the present invention, the one end portion of the spring is secured on the plate, and this plate is then fixed on the piston. As a result, the secured state of the spring is not adversely affected by the difference between the external and internal diameters of the piston and spring so that the external and internal diameters can be set in good assemblability while securing the spring reliably on the piston through the plate.

Other objects and advantages of the present invention will easily become apparent from the following description.

DETAILED DESCRIPTION OF THE PREFERRED EMBODIMENTS

Figure 1:
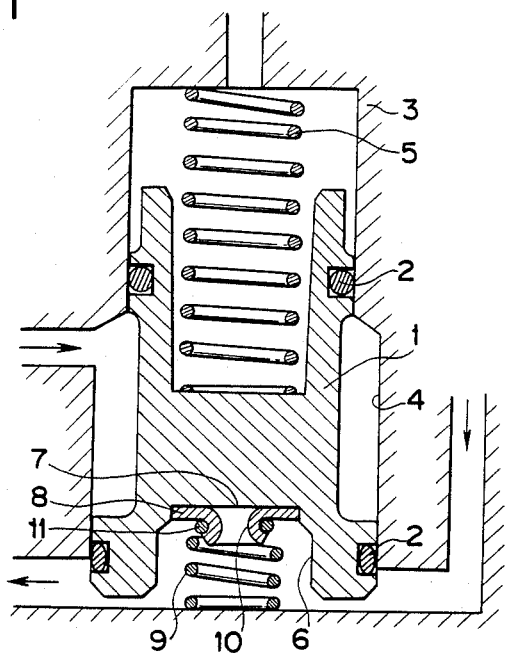
FIG. 1 is a sectional view showing one embodiment of the present invention.

In FIG. 1 showing one embodiment of the present invention, reference numeral 1 designates a piston. This piston 1 is so fitted like that of the accumulator of the prior art in a cylinder 4 formed in valve body 3 as to slide along the axis of the cylinder 4 in the moving directions of the piston through a sealing element or O-ring 2 which fitted on the outer circumference thereof. In the cylinder 4 at the trailing end side (or upper side, as viewed in FIG. 1) of the piston 1, there is disposed a return spring 5 which acts to urge the piston 1 in its moving direction along the axis of the cylinder 4 out of the cylinder 4. The leading end portion (which is located at the end opposite to the return spring 5) is formed with a bottomed cylindrical hollow portion 6. On the bottom 7 of this hollow portion 6, there is secured a plate 8 on which is secured one end portion of a coil counter-spring 9. Since the counter-spring 9 acts to urge the piston in the same direction as the hydraulic pressure applied to the bottom side of cylinder 4, sliding resistance of piston 1 is counteracted.

Specifically, the plate 8 is made of a metal, for example, and is formed at its center with a cylindrical projection or nut 10 by the burring process. On the nub 10, there is fitted one turn of the counter-spring 9 at its leading reduced end 11. This reduced end 11 of the spring 9 is trapped by caulking or punching the leading end of the cylindrical nub 10 so that it is warped radially outwardly an the spring 9 is secured on the plate 8. After the spring 9 has been secured, the plate 8 is closely fitted on the bottom 7 of the hollow portion 6 of the piston 1 and then secured on the piston 1 by caulking or punching a portion of the inner wall of the hollow portion 6 fitting the plate 8.

With the construction thus far described, the spring 9 can be secured on the piston 1 even if its external diameter is considerably smaller than the internal diameter of the hollow portion 6 of the piston 1. Moreover, presence of the sufficient gap can facilitate assembly of the counter-spring 9.

Figure 2:
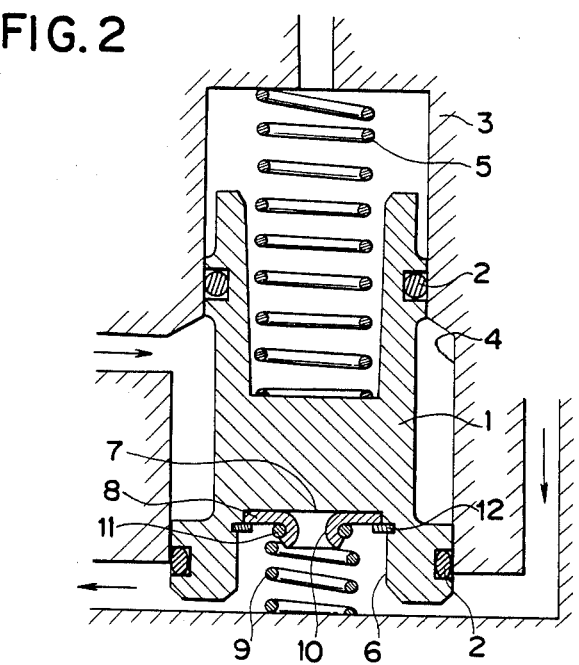
FIG. 2 is similar to FIG. 1 but shows another embodiment of the present invention.

In the spring invention, the caulking means for securing the plate 8 may be replaced, if necessary, by another suitable means. As shown in FIG. 2, for example, the plate 8 can be secured by fitting a snap ring 12 in the inner circumference of the hollow portion 6 of the piston 1. Likewise, the counter-spring 9 can be secured on the plate 8 by means other than the aforementioned caulking one. On the other hand, the present invention can also be applied to another case in which the return spring 5 is to be secured on the piston 1.

In the accumulator according to the present invention, as is now apparent from the description thus far made, the spring is secured without fail on the piston through the plate even if it is loosely fitted in the piston. This loose fitting in turn establishes the sufficient gap between the spring and the inner wall of the piston to facilitate the assembly. In other words, the spring can be reliably secured even if the difference between the external and internal diameters of the spring and piston is enlarged so as to improve the assemblability of the spring. Thus, the present invention can compatibly satisfy the assemblability and stability of the spring when secured.

What is claimed is

1. An accumulator comprising: a cylinder; a piston fitted in said cylinder in a manner to move in response to a hydraulic pressure; a return spring at one end of the piston for urging the piston against the hydraulic pressure; and a sealing element for sealing up the outer circumference of said piston and the inner circumference of said cylinder,
    wherein the improvement comprises:
        a bottomed cylindrical hollow portion formed at the end of said piston opposite to the return spring;
        a plate secured to the bottom of said hollow portion by caulking on the inner wall of said hollow portion near said bottom; and
        a counter-spring secured on said plate such that the axis of the counter-spring is aligned with the axis of said piston, whereby said counter-spring urges said piston in the direction opposite to the urging direction of the return spring.

2. An accumulator according to claim 1, wherein said plate has a cylindrical nub projecting from one side thereof, and wherein said counter-spring is a coil spring having a turn at one end fitted on the outer circumference of said nub and trapped by the leading end portion of said nub which is warped radially outwardly.

3. An accumulator according to claim 1, wherein a gap is left between the outer circumference of said counter-spring and the inner circumference of said hollow portion.

4. An accumulator comprising: a cylinder; a piston fitted in said cylinder in a manner to move in response to a hydraulic pressure; a return spring at one end of the piston for urging the piston against the hydraulic pressure; and a sealing element for sealing up the outer circumference of said piston and the inner circumference of said cylinder,
    wherein the improvement comprises:
        a bottomed cylindrical hollow portion formed at the end of said piston opposite to the return spring;
        a plate secured to the bottom of said hollow portion by a snap ring fitted in said hollow portion; and
        a counter-spring secured on said plate such that the axis of the counter-spring is aligned with the axis of said piston, whereby said counter-spring urges said piston in the direction opposite to the urging direction of the return spring.

5. An accumulator according to claim 4, wherein said plate has a cylindrical nub projecting from one side thereof, and wherein said counter-spring is a coil spring having a turn at one end fitted on the outer circumference of said nub and trapped by the leading end portion of said nub which is warped radially outwardly.

6. An accumulator according to claim 4, wherein a gap is left between the outer circumference of said counter-spring spring and the inner circumference of said hollow portion.

7. An accumulator comprising: a cylinder; a piston fitted in said cylinder in a manner to move in response to a hydraulic pressure; and a sealing element for sealing up the outer circumference of said piston and the inner circumference of said cylinder,
    wherein the improvement comprises:
        a spring for urging said piston in a first one of the moving directions of said piston;
        a bottomed cylindrical hollow portion formed in the end of said piston toward said first moving direction; and
        a plate secured to the bottom of said hollow portion by caulking on the inner wall of said hollow portion near said bottom, said spring being secured to said piston through said plate.

8. An accumulator according to claim 7, wherein said plate has a cylindrical nub projecting from one side thereof, and wherein said spring is a coil spring having a turn at one end fitted on the outer circumference of said nub and trapped by the leading end portion of said nub which is warped radially outwardly.

9. An accumulator according to claim 7, wherein a gap is left between the outer circumference of said spring and the inner circumference of said hollow portion.

10. An accumulator comprising: a cylinder; a piston fitted in said cylinder in a manner to move in response to a hydraulic pressure; and a sealing element for sealing up the outer circumference of said piston and the inner circumference of said cylinder,
    wherein the improvement comprises:
        a spring for urging said piston in a first one of the moving directions of said piston;

a bottomed cylindrical hollow portion formed in the end of said piston toward said first moving direction; and a plate secured to the bottom of said hollow portion by a snap ring fitted in said hollow portion, said spring being secured to said piston through said plate.

11. An accumulator according to claim 10, wherein said plate has a cylindrical nub projecting from one side thereof, and wherein said spring is a coil spring having a turn at one end fitted on the outer circumference of said nub and trapped by the leading end portion of said nub which is warped radially outwardly.

12. An accumulator according to claim 10, wherein gap is left between the outer circumference of said spring and the inner circumference of said hollow portion.

* * * * *